No. 660,007. Patented Oct. 16, 1900.
G. H. DROEGE.
COFFEE MILL.
(Application filed July 19, 1900.)
(No Model.) 2 Sheets—Sheet 1.
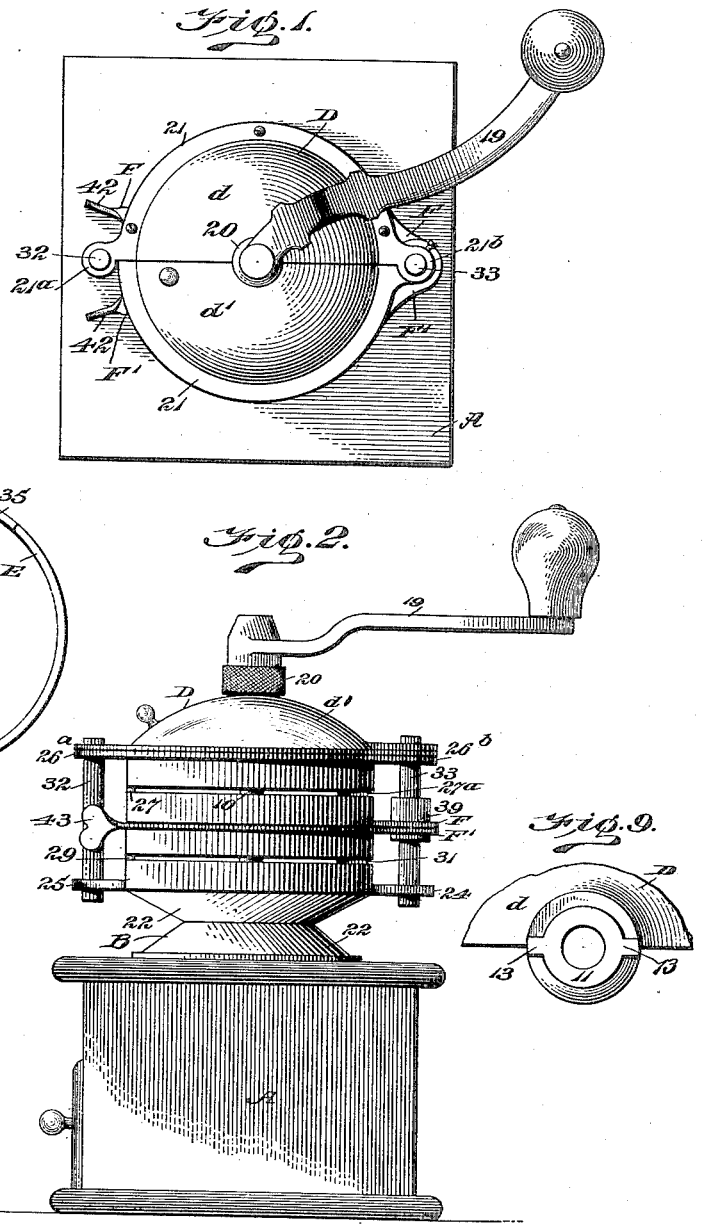
WITNESSES.
INVENTOR
George H. Droege.
BY
ATTORNEYS No. 660,007. Patented Oct. 16, 1900.
G. H. DROEGE.
COFFEE MILL.
(Application filed July 19, 1900.)
(No Model.) 2 Sheets—Sheet 2.
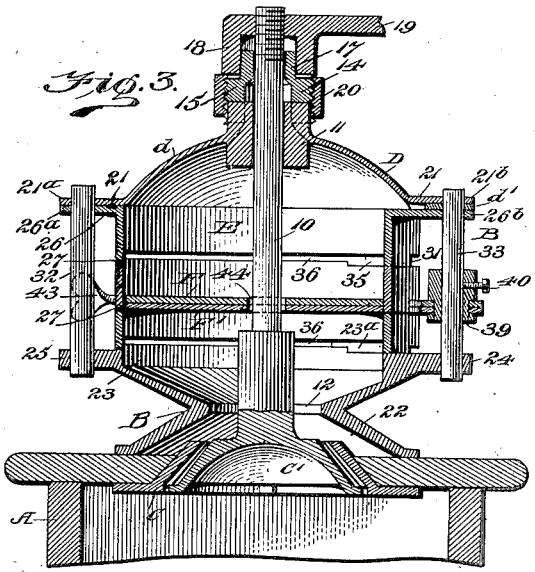
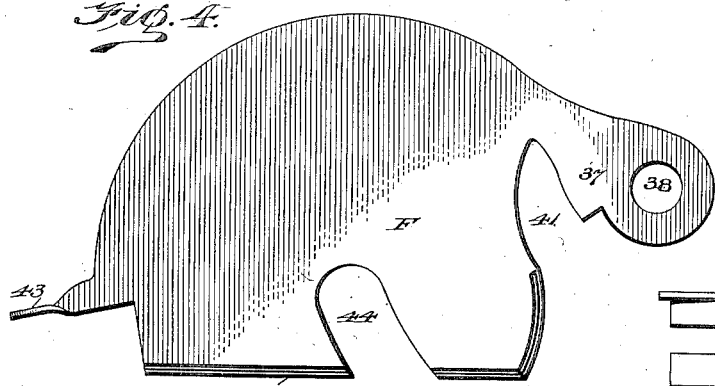
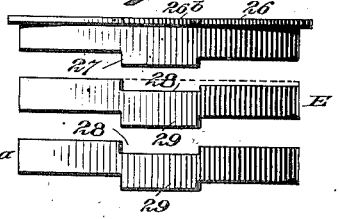
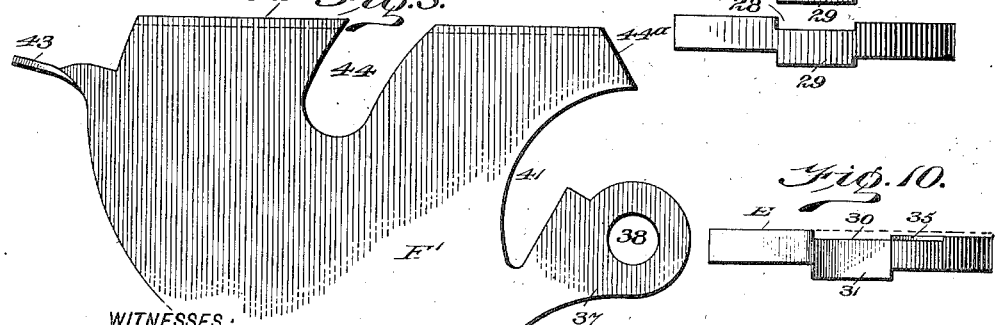
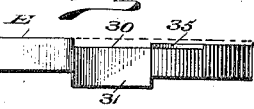
WITNESSES:
INVENTOR
George H. Droege,
BY
ATTORNEYS

UNITED STATES PATENT OFFICE.

GEORGE H. DROEGE, OF NEW YORK, N. Y.

COFFEE-MILL.

SPECIFICATION forming part of Letters Patent No. 660,007, dated October 16, 1900.

Application filed July 19, 1900. Serial No. 24,176. (No model.)

*To all whom it may concern:*

Be it known that I, GEORGE H. DROEGE, a citizen of the United States, and a resident of the city of New York, borough of Brooklyn, in the county of Kings and State of New York, have invented a new and Improved Coffee-Mill, of which the following is a full, clear, and exact description.

One purpose of the invention is to provide a coffee-mill which will be practically self-measuring, the construction being such that the hopper may be filled with coffee-beans in the usual way, but whereby cut-offs may be adjusted to pass through slots and separate a certain quantity from the bulk of beans, which quantity only will be operated upon by the grinders.

A further object of the invention is to so gage the slots at which the cut-offs enter that each division in the hopper will represent enough beans when ground to make a certain number of cups of coffee of average strength, the number of cups of coffee to be obtained as each cut-off is made appearing opposite the slots at which the divisions are effected, thus enabling one to be assured of having liquid of uniform strength and in a great measure preventing waste.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved mill. Fig. 2 is a side elevation thereof. Fig. 3 is a vertical section through the improved mill. Figs. 4 and 5 are plan views of blades used as cut-offs in connection with the hopper of the mill. Fig. 6 is a side elevation of the rings which form a portion of the body of the hopper of the mill, the rings being separated and viewed from the front. Fig. 7 is a side elevation of the fixed or stationary section of the cover for the hopper. Fig. 8 is a section through a sleeve employed in connection with the section of the hopper-cover shown in Fig. 7. Fig. 9 is a partial plan view of the fixed section of the cover for the hopper. Fig. 10 is a rear elevation of one of the rings shown in Fig. 6, and Fig. 11 is a plan view of one of the intermediate rings shown in the group in Fig. 6.

A represents the body or box of a coffee-mill; B, the hopper, which rests upon the said body, and C and C' respectively represent the fixed and the rotary grinders, which may be of any suitable form. The rotary grinder C' is attached to the lower end of a shaft 10, and this shaft extends up through the hopper and through a sleeve 11, formed at the upper portion of the stationary section $d$ of a cover D, provided for the hopper, the other section $d'$ of the cover for the hopper being hinged or pivoted, so that it can be swung to one side and the hopper filled. The hopper is provided with an opening 12 in its bottom, which enables the coffee-beans to pass to the grinders, and at the upper portion of the sleeve 11 on the cover D two opposing lugs 13 are formed. The sleeve 11 is adapted to receive the lower portion of a collar 14. (Shown in Figs. 3 and 8.) The lower portion of this collar 14 is of greater diameter than the upper portion and is provided with an exterior thread 15 and with recesses 16 in its bottom, the recesses being arranged to receive the lugs 13 of the sleeve 11, and in this manner the collar 14 is held from turning on the said sleeve. The upper portion 17 of the collar receives the socket-section 18 of a handle 19, and this handle is screwed or otherwise attached to the upper end of the shaft 10. By raising or lowering the handle 19, and consequently the shaft 10, the grinders C and C' are brought closer together or carried farther apart, as may be desired, and such an adjustment is accomplished through the medium of a nut 20, screwed upon the threaded surface 15 of the collar 17, and the upper edge of the said nut has bearing against the bottom portion of the socket-section 18 of the said handle, as is clearly shown in Fig. 3. The cover-sections $d$ and $d'$ are provided with horizontal marginal flanges 21; but the fixed cover-section $d$ is provided at the front and at the rear with projections or ears, (designated, respectively, as $21^a$ and $21^b$.) At the bottom portion of the hopper B a conical base 22 is provided, which rests upon the box-body A of the device, as is shown in Figs. 2 and 3. This base is immediately over the grinders C and C'.

The bottom proper of the hopper B is conical and is provided at its upper edge with a marginal upright flange 23, in which flange at one side of its rear portion a depression 23ª is made, as shown in Fig. 3, adapted to receive a member of a cut-off plate to be hereinafter described. The bottom portion of the hopper B is provided at the rear with a horizontal lug 24 and at the front with a corresponding lug 25, the lug 25 being beneath the projection 21ª of the fixed cover-section $d$ of the hopper, and the lug 24 is beneath the rear projection 21$^b$ from the said fixed cover-section, as is also shown in Fig. 3. The intermediate portion of the hopper B, or that portion which is between the bottom and the cover, is made up of a series of rings E. (Shown in detail in Figs. 6, 10, and 11.) The upper ring of this series is provided with a marginal outwardly-extending flange 26, adapted to meet the flanges 21 on the cover, and to which the flange of the fixed cover-section $d$ is secured. The upper ring of the said series is also provided with a front lug 26ª and a rear lug 26$^b$, and these lugs 26ª and 26$^b$ are adapted to be immediately below the lugs 21ª and 21$^b$ of the fixed section $d$ of the cover of the hopper, as is also shown in Fig. 3. The movable section $d'$ of the said cover is pivoted between the lugs 21$^b$ and 26$^b$. The said upper ring of the series E is provided at the front with a projection 27 from its lower edge, which projection conforms to the circular formation of the said ring; but at the back of this upper ring a projection 27ª is formed, extending below the lower edge of the ring, as shown in Fig. 2, and this projecting portion of the ring and the part of the ring just above the projection are concaved or curved inward in substantially the same manner as is illustrated in Fig. 10, which illustrates a corresponding portion of one of the intermediate rings of the series E. Each intermediate ring is provided at the front with a depression 28, adapted to receive the forward lower projection of the ring above it, and each of the intermediate rings is also provided at the front with a projection 29, extending downward from its lower edge, adapted to fit into the upper depression 28 of the ring below it, and the downward projection of the lowermost of the intermediate rings is adapted to enter a depression in the flange 23 of the bottom portion of the hopper. At the rear of each intermediate ring an upper depression 30 is formed, as shown in Figs. 10 and 11, and a lower projection 31 is likewise formed below the depression; but that portion of each ring between the depression 30 and projection 31 is curved inward or in a forward direction, so that a space may be provided in which the knuckles of the cut-off blades to be hereinafter described may freely operate. A pin 32 is passed through the front lower lug 25 and through the lugs or projections 26ª and 21ª from the upper ring forming the body of the hopper and the fixed cover-section $d$, while at the rear a second pin 33 is passed through the corresponding projections 24, 26$^b$, and 21$^b$ and loosely through a rear projection from the flange of the movable section $d'$ of the cover, as is best illustrated in Figs. 2 and 3. Each of the intermediate rings of the series E is provided with a slight depression 35 in its upper edge at one side of the semicircular or curved depression 30, and these slight depressions 35 correspond to the depression 23ª heretofore mentioned in connection with the bottom portion of the hopper B, as is illustrated in Fig. 3.

In connection with the hopper B two cut-off blades F and F' are employed, adapted to pass one over the other and through the openings 36, which are provided between the rings in the series E and between the lowermost ring and the bottom of the hopper. These cut-off blades are shown in detail in Fig. 4, and each cut-off blade is provided with a knuckle 37, having an opening 38 therein, and when the knuckles are brought together their openings 38 are in registry, and a sleeve 39 is passed through the said openings. This sleeve is mounted to slide on the rear pin 33, being held in any desired position on said pin by means of a set-screw 40 or its equivalent. This adjustment of the cut-off blades is provided in order that the blades may be placed in position to operate through any one of the openings 36. Each cut-off blade F and F' adjacent to its knuckle is provided with a curved recess 41, which enables the blades to pass freely around the convexed surfaces formed by the concaved rear sections of the rings between the surfaces 30 and 31 of said rings. Both of the cut-off blades have straight inner edges; but the cut-off blade F has its inner straight edge 42 beveled from the top downward and likewise its rear side edge, as shown in Fig. 4, while the corresponding edges of the opposing cut-off blade F' are beveled upon their lower faces. Each of the cut-off blades at its front is provided with a handle 43, by means of which the blades are manipulated, and each cut-off blade at its straight cutting edge is provided with a recess 44, inclined in an outward direction and in direction of the front, so that when the two cut-off blades F and F' are placed with their cutting edges parallel the recesses 44 in the cutting-surfaces of these blades will be at angles to each other, as illustrated in Figs. 4 and 5. These recesses 44 receive the shaft 10, connected with the movable grinder C', and as the cut-off blades are closed one over the other they likewise are brought closely around the shaft 10, owing to the aforesaid recesses 44.

The cut-off blade F' differs from the blade F in that a rear extension 44ª is provided at the straight cutting-surface 42, and this extension 44ª is that portion of the blade which first enters the hopper and for which the recesses 23ª and 35 are made at the openings 36.

When these blades are brought together through any one of the openings 36, they completely cut off the bulk of coffee-beans in the hopper from a point at the top of the hopper to the upper surfaces of the blades, while all the beans which are contained in the hopper below the blades will find free access to the grinders C and C'.

The rings are so formed and the spaces between them are so graduated that when the cut-off blades are made to operate in any one of the openings 36 enough coffee-beans will be fed to the grinders to make a certain number of cups of coffee of average strength when the beans are ground and properly treated, and at the front portion of the hopper numerals are usually produced on the rings at each opening 36, indicating the number of cups of coffee that may be prepared from the ground beans when the cut-off blades are brought into operation in the several openings 36. For example, when a cut-off is effected at the lower opening 36 the coffee-beans thus selected will be sufficient when ground to produce four cups of coffee, eight cups being the number which may be produced when the cut-off is made at the next opening 36 above, and so on to the upper portion of the hopper. Under such an arrangement it will be observed that a saving of coffee is effected, since only enough coffee for a given number of cups need be ground, and the coffee made by this method will be of uniform strength. When the cut-off blades are to be adjusted, they are carried out entirely from the hopper, and the sleeve 39 is moved a sufficient distance up or down on the pin 33 to bring these blades in operative position relative to any one of the openings 36 required.

The oppositely-inclined cutting edges of the cut-off blades serve to force aside the coffee-beans that may be in the path of the blades as said blades are drawn together, or the said cutting edges may cut the beans that are in their path, but will act at all times to clear the way for the passage of the body portions of the blades through the mass of beans.

Having thus described my invention, I claim as new and desire to secure by Letters Patent—

1. In a coffee-mill, a hopper provided with a series of circumferential openings, a pivot-pin located at the exterior of the hopper, a sleeve adjustable on said pin, and cut-off blades pivotally attached to said sleeve, the blades being arranged to cross one another and to enter an opening in the hopper from opposite sides, substantially as specified.

2. In a coffee-mill, a hopper provided with a series of circumferential openings, a pivot-pin located at the exterior of the hopper, a sleeve adjustable upon the said pin, and cut-off blades pivotally attached to the said sleeve, the blades being arranged to cross one another and to enter an opening in the hopper from opposite sides, the opposing edges of the blades having an opposite bevel, for the purpose specified.

3. In a coffee-mill, the combination, with a fixed grinder, a rotary grinder, a shaft attached to the rotary grinder, means for raising and lowering the said shaft, and a handle for the said shaft, the said adjusting means being adjacent to said handle, of a hopper comprising a bottom section and a cover-section, and intermediate ring-sections, the said ring-sections having front and rear projections from their lower edges and corresponding depressions in their upper edges, whereby a series of openings is formed between the ring-sections and the lowermost ring-section and the base of the hopper, cut-off blades, a pivotal support for the said blades located at the exterior of the hopper, the said blades having adjustment upon their pivotal support, said blades being arranged to enter either one of the openings in the hopper formed by the rings, the blades entering an opening from opposite sides and being arranged to pass at such time one over the other, the said blades having opposing cutting edges oppositely inclined, and recesses in their cutting edges adapted to receive the shaft connected with the movable grinder, the walls of the said recesses being adapted to closely fit to the shaft when the blades have fully entered an opening, for the purpose set forth.

In testimony whereof I have signed my name to this specification in the presence of two subscribing witnesses.

GEORGE H. DROEGE.

Witnesses:
EDWARD EBLING,
J. M. BARRETT.